April 4, 1944.

E. J. WELLS 2,345,845

DIAL TEST INDICATOR

Filed March 20, 1943

INVENTOR
*EARL J. WELLS*

BY
ATTORNEY

Patented Apr. 4, 1944

2,345,845

UNITED STATES PATENT OFFICE 2,345,845

DIAL TEST INDICATOR

Earl J. Wells, Comptche, Calif.

Application March 20, 1943, Serial No. 479,893

2 Claims. (Cl. 33—172)

This invention relates to a dial test indicator. These devices are employed for lining up shafts, testing the truth of centers, the alignment of a piece of work in a lathe, the roundness of a hole, and like machine operations.

This general type of instrument has been in use for many years. However, the tool of the present invention is characterized by simplicity in operation, compactness, ruggedness. In addition, it possesses features of construction making the instrument more sensitive than those heretofore available.

It is in general the broad object of the present invention to provide an improved dial test indicator.

The invention includes other objects and features of advantage, some of which, together with the foregoing, will appear hereinafter wherein the present preferred form of dial test indicator is disclosed.

In the drawing accompanying and forming a part hereof,

Figure 1:
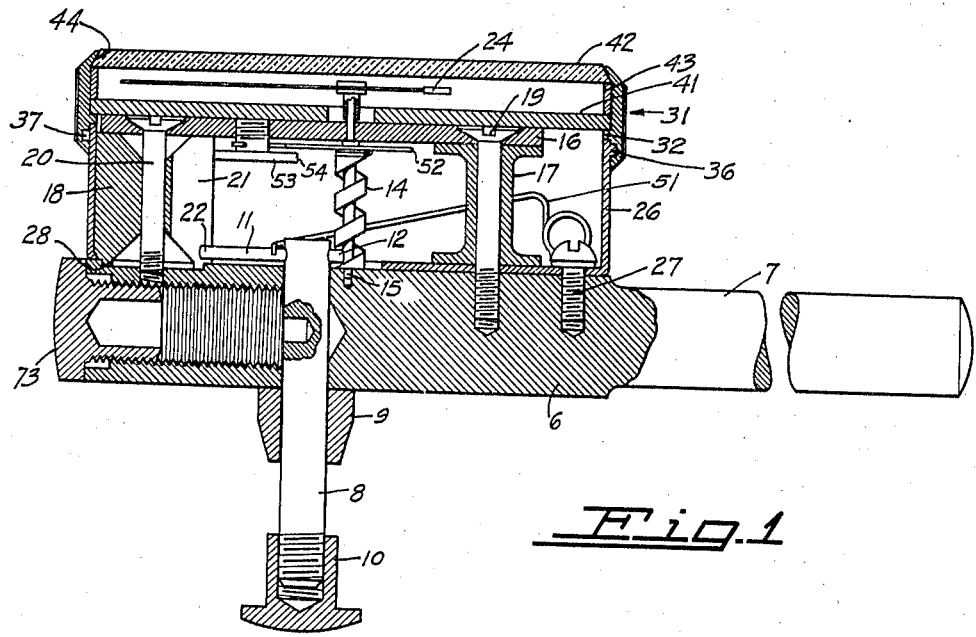
Figure 1 is a side elevation partly in section showing the construction of a preferred form of tool.

Referring to the drawing, the numeral 6 is applied to a base structure having an extension 7 thereon adapting the tool for mounting in any suitable manner on a fixed support. Mounted upon the base and slidable therein is a member or plunger 8 partially supported by the base and partially by a bearing 9 secured on the base. A contact point 10 is screwed onto the extending end of the plunger to be brought into contact with the shaft or work to be tested. At its other end a pin 11 is extended through the plunger 8 with its end 12 in engagement with a worm 14 fashioned as part of a shaft 15. Sliding movement of the plunger rotates the worm in either direction.

Shaft 15 is supported for rotation in a suitable bearing formed in the base 6 and in a bearing provided by plate 16. Shaft 15 extends above plate 16 and carries an indicator arm 24. Plate 16 is spaced above base 6 by spacers 17 and 18, the spacers being respectively retained in position by screws 19 and 20. Spacer 20 includes a deep longitudinal slot 21 in which end 22 of pin 11 slides, the slot serving to prevent plunger 8 from rotating as it slides back and forth.

To enclose the several working parts, a cup or casing 26 is provided on the base, being retained in position by screw 27 and by screws 19 and 20 which extend through the casing into the base. An aperture 28 is formed in the casing and cooperates with the correspondingly formed portion on spacer 18, to provide accurate alignment of this spacer.

Mounted for a limited rotation on casing 26 is a cover generally indicated at 31 and fitting down onto casing 26 to the extent permitted by internal circular extension 32. To retain the cover in place, several tongues 36 are pressed out of the cover into slot 37 in casing 26. This permits the cover to be rotated on the casing while retaining the cover on the casing. By springing the cover slightly before it is installed, a tight frictional engagement is ensured. Adjustment of the dial position to the indicator arm facilitates and simplifies use of the device.

An indicator dial 41 is placed inside the cover against flange 32 therein. Usually this dial is calibrated in thousandths of an inch. A transparent crystal 42 is held above the dial by a spacer 43 interposed between the dial 41 and the crystal. The periphery of the crystal is tapered as at 44 and the rim of the cover, likewise tapered, is pressed inwardly to retain the crystal in place.

A spring 51 is secured by screw 27 on the base, the spring being engaged with the pin 11 to bias the plunger 8 against sliding. A spiral spring 52 is secured at one end to the shaft or to the worm 14, while at the other end it is fastened to member 53 carried on plate 16. It is to be noted that member 53 includes an enlarged head 54 which extends over and is engaged by plunger 8 as it moves upwardly. This ensures that if the plunger is moved in too far, as when the instrument is dropped or if the plunger be pressed upwardly without one of the contact points 10 thereon, damage to the instrument will be avoided because the stop 54 prevents the plunger from moving the worm through its full limit of rotation.

The pitch of the worm is such that the exact lineal movement of the plunger is exactly transferred to the indicator arm 24 as it moves over the calibrated dial. For example, with the dial calibrated in thousandths, each thousandths movement of the plunger is accurately represented on the dial. The springs cooperate and eliminate the effect of wear or any back lash on reverse movement of the plunger.

By providing the hairlike spiral spring directly on the shaft or worm, the sensitivity of the instrument is materially increased, at the same time it is possible to provide a tool of this character without the use of gears or internal levers. Further, assembly and construction is facilitated for only three screws are utilized in the entire device, while all parts, with the exception of the plunger, are contained in a suitable casing structure and protected from damage, dirt or tampering.

Figure 2:
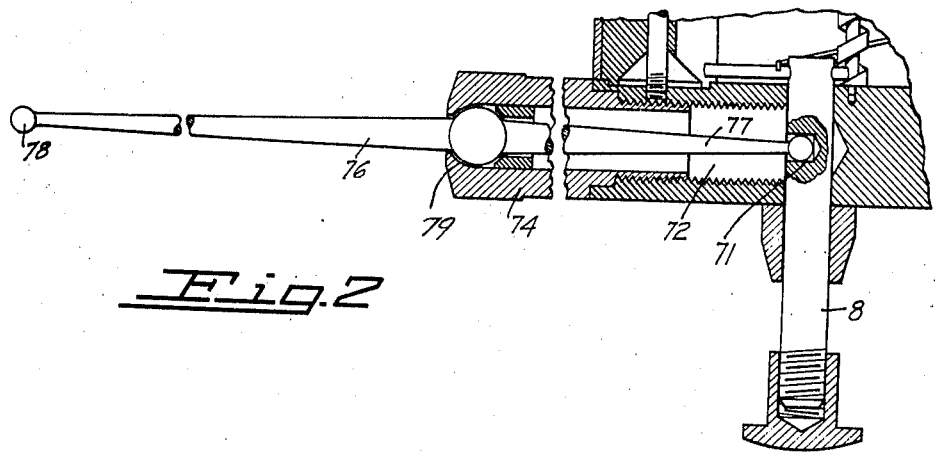
Figure 2 is a fragmentary side elevation partly in section, showing the tool adapted for use in determining the roundness of a hole.

In Figure 2 I have shown the device modified to permit its use as an inside attachment. In this, use is made of aperture 71 in plunger 8. Base 6 is relieved as at 72. Normally this is closed by screw plug 73. However, upon removing the screw plug, threaded attachment 74 is inserted and screwed into place. This carries the pivotally mounted arm 76. End 77 of this arm is engaged with aperture 71 in the plunger while the other end 78 extends for engagement with the work. This permits the use of the device as an inside attachment with all of the parts except the extending end 77 totally enclosed and protected, a feature of advantage when the tool is used under usual working conditions.

From the foregoing it will be seen that the instrument of my invention is simple, rugged and yet extremely accurate and responsive. It omits the troublesome internal gearing usually employed in devices of this sort. By mounting arm 76 in the body of the device with the internal ball and socket joint 79, the device can be employed to examine either internal or external surfaces while the entire device is sealed against dirt.

I claim:

1. In a dial test indicator of the class described, the improvement consisting in a casing having a base, a plate, spacers supporting said plate above said base and in said casing, screws extending through said spacers from said plate into said base to secure said plate and base together with said casing, a dial and cover glass unit mounted and supported for rotation on said casing and on said plate.

2. In a dial test indicator of the class described, the improvement consisting in a casing, a base, a plate, spacers supporting said plate above said base and in said casing, screws extending through said spacers from said plate into said base to secure said plate, casing and base together, and a dial and cover glass unit mounted and supported for rotation on said casing and on said plate.

EARL J. WELLS.